US010683796B2

(12) United States Patent
Klingbeil et al.

(10) Patent No.: US 10,683,796 B2
(45) Date of Patent: Jun. 16, 2020

(54) SYSTEMS AND METHODS FOR REDUCED OIL CARRYOVER (71) Applicant: General Electric Company, Schenectady, NY (US)

(72) Inventors: Adam Edgar Klingbeil, Niskayuna, NY (US); Roy James Primus, Niskayuna, NY (US); Edward Joseph Hall, Lawrence Park, NY (US)

(73) Assignee: GENERAL ELECTRIC COMPANY, Schenectady, NY (US)

( * ) Notice: Subject to any disclaimer, the term of this patent is extended or adjusted under 35 U.S.C. 154(b) by 143 days.

(21) Appl. No.: 15/085,724

(22) Filed: Mar. 30, 2016

(65) Prior Publication Data
US 2017/0284318 A1 Oct. 5, 2017

(51) Int. Cl.
| *F02B 37/14* | (2006.01) |
| *F02D 41/00* | (2006.01) |
| *F02B 37/10* | (2006.01) |
| *F02M 35/104* | (2006.01) |
| *F02M 35/10* | (2006.01) |
| *F02D 41/08* | (2006.01) |
| *F02B 33/44* | (2006.01) |
| *F01M 13/02* | (2006.01) |
| *F01M 13/00* | (2006.01) |

(52) U.S. Cl.
CPC ........... *F02B 37/14* (2013.01); *F01M 13/021* (2013.01); *F02B 33/446* (2013.01); *F02B 37/10* (2013.01); *F02D 41/0007* (2013.01); *F02D 41/08* (2013.01); *F02M 35/104* (2013.01); *F02M 35/10157* (2013.01); *F01M 2013/0005* (2013.01); *F01M 2013/026* (2013.01); *F01M 2013/027* (2013.01); *Y02T 10/144* (2013.01)

(58) Field of Classification Search
CPC ....... F02B 37/10; F02B 37/14; F01M 13/021; F01M 2013/026; F01M 2013/027
USPC .............. 60/607, 608; 123/41.86, 196, 559.1
See application file for complete search history.

(56) References Cited

U.S. PATENT DOCUMENTS 4,253,031 A * 2/1981 Frister ..................... F01D 15/10
290/52
4,769,993 A * 9/1988 Kawamura ........... F02B 37/005
290/52

(Continued)

OTHER PUBLICATIONS

Dusane et al., "Development of Oil Mist Separator and Evaluation With Oil Droplet Diameter Using Multiphase Simulation for Diesel Engine", International Journal of Research in Engineering & Advanced Technology, Oct.-Nov. 2014, vol. 2, Issue: 5, pp. 1-5.

*Primary Examiner* — Kevin R Steckbauer
(74) *Attorney, Agent, or Firm* — Ryan N. Kelley; The Small Patent Law Group, LLC (57) ABSTRACT A system in one embodiment includes at least one cylinder, a supplemental boost supply, and a supply line. The at least one cylinder is configured for use in a reciprocating internal combustion engine, and includes a combustion portion and a crank portion on opposite sides of a piston. The at least one cylinder also includes an intake port and an exhaust port in fluid communication with the combustion portion. The supplemental boost supply is configured to provide a supplemental air supply to the combustion portion of the engine when the engine is idling to increase pressure in the combustion portion. The supply line couples the supplemental boost supply to the intake port.

13 Claims, 4 Drawing Sheets (56) References Cited

U.S. PATENT DOCUMENTS

| | | | | |
|---|---|---|---|---|
| 4,894,991 | A * | 1/1990 | Kawamura | F02B 37/10 60/608 |
| 4,945,864 | A | 8/1990 | Solomon et al. | |
| 4,981,017 | A * | 1/1991 | Hara | F02B 37/10 60/608 |
| 5,479,907 | A | 1/1996 | Walker, Jr. | |
| 5,560,208 | A * | 10/1996 | Halimi | F02B 37/025 60/608 |
| 5,605,045 | A * | 2/1997 | Halimi | F01D 5/085 310/52 |
| 5,906,098 | A * | 5/1999 | Woollenweber | F02B 37/005 60/608 |
| RE36,609 | E * | 3/2000 | Halimi | F02B 37/025 60/608 |
| 6,032,466 | A * | 3/2000 | Woollenweber | F01D 25/164 417/407 |
| 6,062,026 | A * | 5/2000 | Woollenweber | F02B 37/04 60/605.2 |
| 6,079,211 | A * | 6/2000 | Woollenweber | F02B 37/025 60/602 |
| 6,141,965 | A * | 11/2000 | Woollenweber | F02B 33/40 60/608 |
| 6,256,993 | B1 * | 7/2001 | Halimi | F02B 37/025 60/600 |
| 7,055,510 | B2 | 6/2006 | Deane et al. | |
| 7,174,876 | B2 * | 2/2007 | Suzuki | F01M 1/12 123/196 R |
| 7,424,871 | B2 | 9/2008 | Zajac | |
| 7,953,541 | B2 | 5/2011 | Roth et al. | |
| 8,266,891 | B2 | 9/2012 | Soliman et al. | |
| 8,267,072 | B2 * | 9/2012 | Pursifull | B60T 17/02 123/198 C |
| 8,640,680 | B2 * | 2/2014 | Pursifull | B60T 17/02 123/198 C |
| 8,955,500 | B2 * | 2/2015 | Spix | F02M 25/06 123/572 |
| 9,212,630 | B2 | 12/2015 | Peters et al. | |
| 9,810,169 | B2 * | 11/2017 | Desai | F02D 41/064 |
| 2006/0102429 | A1 * | 5/2006 | Suzuki | F01M 1/12 184/6.5 |
| 2006/0147318 | A1 | 7/2006 | Atrey et al. | |
| 2011/0176931 | A1 * | 7/2011 | Pursifull | B60T 17/02 417/1 |
| 2013/0000593 | A1 * | 1/2013 | Pursifull | B60T 17/02 123/196 R |
| 2016/0146076 | A1 * | 5/2016 | Newman | F02B 37/00 123/559.1 |
| 2017/0089279 | A1 * | 3/2017 | Yoeda | F02M 26/47 |
| 2017/0107873 | A1 * | 4/2017 | Ali | F01M 1/12 |
| 2017/0107886 | A1 * | 4/2017 | Meano | F02D 41/029 |
| 2017/0356403 | A1 * | 12/2017 | Zhao | F02B 33/34 |

\* cited by examiner

SYSTEMS AND METHODS FOR REDUCED OIL CARRYOVER

BACKGROUND

Engines, such as internal combustion engines, may utilize a piston that reciprocates in a cylinder. Seals may be disposed around sides of the piston to inhibit flow of lubricant past the seals into a combustion portion of the cylinder. However, due to low pressure in the combustion portion at idle, as well as slightly higher pressure in the crankcase due to a reduction in crankcase scavenging process, the pressure differential across the piston sealing rings is reduced and oil carryover, or the movement of oil past the seals of the piston into the combustion portion of the cylinder, may occur. The longer the period of time spent idling, the more oil carryover may occur. For example, locomotive engines may idle for days at a time, increasing the potential amount of oil carryover. Oil entering the combustion portion of the cylinder may accumulate in the combustion portion and/or in one or more additional portions of the engine along a path for exhaust from the cylinder. When the engine is operated under load, the accumulated oil may result in health or safety concerns, increased exhaust emissions, and/or fouling of exhaust systems and/or aftertreatment devices (e.g., due to sulfur or other materials in the oil from the oil carryover).

BRIEF DESCRIPTION

In one embodiment, a system includes at least one cylinder, a supply line, and at least one of a supplemental boost supply or a supplemental evacuation system. The at least one cylinder is configured for use in a reciprocating internal combustion engine, and includes a combustion portion and a crankcase portion on opposite sides of a piston. The at least one cylinder also includes an intake port and an exhaust port in fluid communication with the combustion portion. The supplemental boost supply is configured to provide a supplemental air supply to the combustion portion of the engine when the engine is idling to increase pressure in the combustion portion. The supplemental evacuation system is configured to reduce pressure in the crankcase portion of the engine when the engine is idling, wherein oil entry into the combustion portion is inhibited when the engine is idling. The supply line couples the supplemental boost supply to the intake port.

In another embodiment, a method is provided that includes operating a reciprocating internal combustion engine at idle. The engine includes at least one cylinder that includes a combustion portion and a crankcase portion on opposite sides of a piston, as well as an intake port and an exhaust port in fluid communication with the combustion portion. The method also includes at least one of providing, with a supplemental boost supply, a supplemental air supply to the combustion portion of the engine when the engine is idling to increase pressure in the combustion portion, or reducing, with a supplemental evacuation system, pressure in the crankcase portion of the engine.

In another embodiment, a system is provided that includes a supplemental boost supply and a supply line. The supplemental boost supply includes a compressor configured to provide a supplemental air supply to a combustion portion of the engine when the engine is idling to increase pressure in the combustion portion. The supply line couples the supplemental boost supply to the intake port.

In another embodiment, a system is provided that includes a supplemental crankcase evacuation system and a connection line. The supplemental evacuation system is configured to draw gases from the crankcase portion when the engine is idling to decrease pressure on the crankcase side of the portion. The connection line couples the evacuation system to the crankcase portion.

DETAILED DESCRIPTION

Various embodiments will be better understood when read in conjunction with the appended drawings. To the extent that the figures illustrate diagrams of the functional blocks of various embodiments, the functional blocks are not necessarily indicative of the division between hardware circuitry. Thus, for example, one or more of the functional blocks (e.g., processors, controllers or memories) may be implemented in a single piece of hardware (e.g., a general purpose signal processor or random access memory, hard disk, or the like) or multiple pieces of hardware. Similarly, any programs may be stand-alone programs, may be incorporated as subroutines in an operating system, may be functions in an installed software package, and the like. It should be understood that the various embodiments are not limited to the arrangements and instrumentality shown in the drawings.

As used herein, the terms "system," "unit," or "module" may include a hardware and/or software system that operates to perform one or more functions. For example, a module, unit, or system may include a computer processor, controller, or other logic-based device that performs operations based on instructions stored on a tangible and non-transitory computer readable storage medium, such as a computer memory. Alternatively, a module, unit, or system may include a hard-wired device that performs operations based on hard-wired logic of the device. The modules or units shown in the attached figures may represent the hardware that operates based on software or hardwired instructions, the software that directs hardware to perform the operations, or a combination thereof. The hardware may include electronic circuits that include and/or are connected to one or more logic-based devices, such as microprocessors, processors, controllers, or the like. These devices may be off-the-shelf devices that are appropriately programmed or instructed to perform operations described herein from the instructions described above. Additionally or alternatively, one or more of these devices may be hard-wired with logic circuits to perform these operations.

As used herein, an element or step recited in the singular and proceeded with the word "a" or "an" should be understood as not excluding plural of said elements or steps, unless such exclusion is explicitly stated. Furthermore, references to "one embodiment" are not intended to be interpreted as excluding the existence of additional embodiments that also incorporate the recited features. Moreover, unless explicitly stated to the contrary, embodiments "comprising" or "having" an element or a plurality of elements having a particular property may include additional such elements not having that property.

Generally, various embodiments provide, for example, for reduced or eliminated oil carryover for internal combustion engines operating at idle. Various embodiments manipulate or control the power input to an air compression device to supply increased boost pressure to an engine (e.g., a reciprocating compression ignition engine) during idle operation to mitigate oil carryover concerns. Alternatively or additionally, various embodiments decrease the pressure on the crankcase side of the piston during idle operation to mitigate oil carryover concerns. The increased boost on the combustion side of the piston, and/or the pressure decrease on the crankcase side of the piston, provides a more favorable pressure balance on piston rings during idle and low-power operation of the engine (e.g., increasing the pressure in the combustion portion relative to the pressure in the crankcase portion). The improved pressure balance has favorable effect on oil sealing and reduction of oil carryover. In various embodiments, the power manipulation for increased boost is achievable via a variety of device including, but not limited to, an electrically-assisted turbocharger, a super charger, a variable geometry turbocharger, a pneumatically assisted turbocharger, or a separate air compressor. In various embodiments, the pressure reduction in the crankcase is achievable via a variety of devices including, but not limited to, an evacuation pump, an eductor, or a venturi in a region of high flow velocity.

At least one technical effect of various embodiments includes providing increased pressure differential across the piston at idle and/or low power operation of an internal combustion engine to reduce or eliminate oil carryover. At least one technical effect of various embodiments includes providing reduced emissions. At least one technical effect of various embodiments includes reducing damage to exhaust systems and/or aftertreatment systems from fouling materials of lubrication oil.

Figure 1:
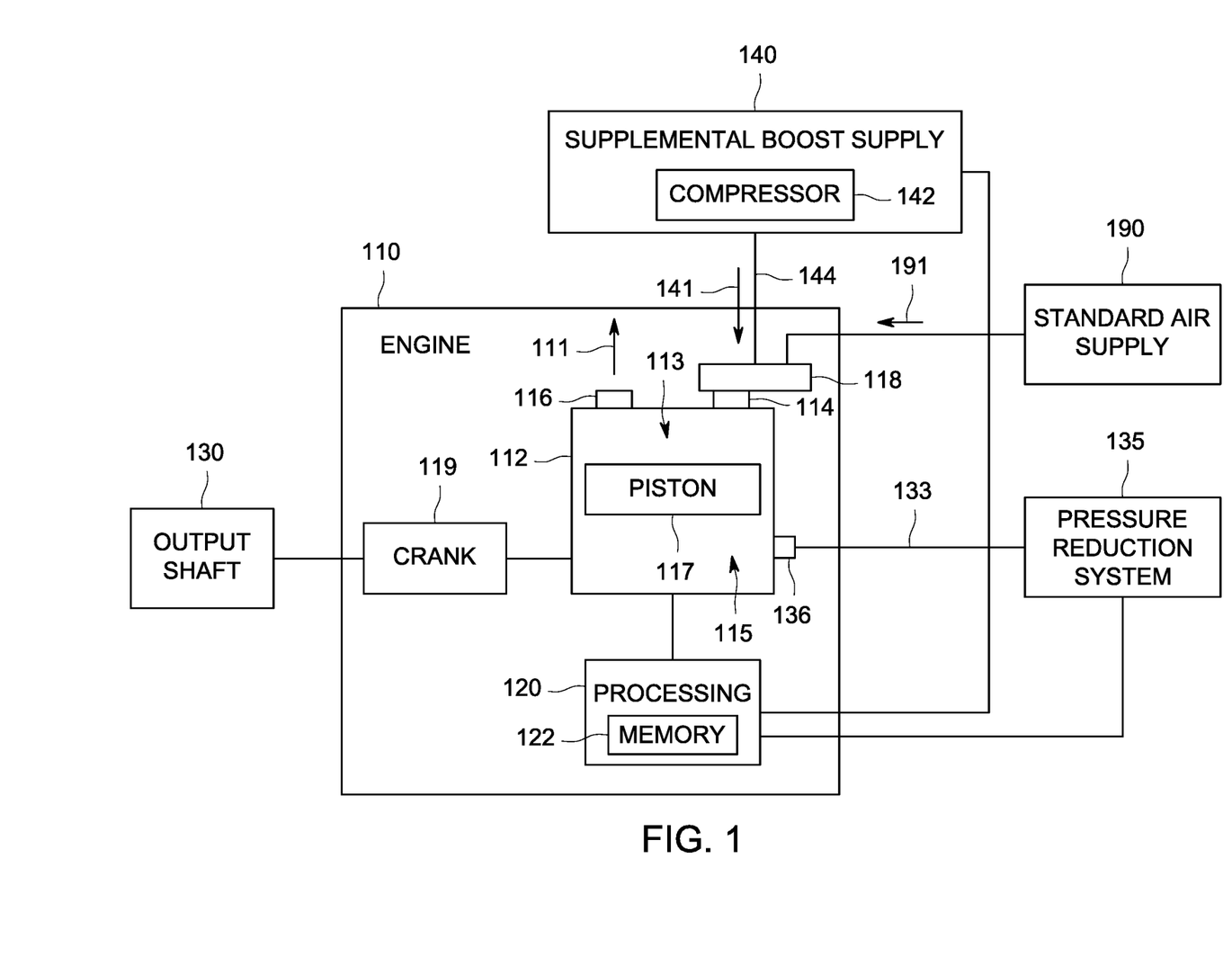
FIG. 1 is a schematic block diagram of an engine system in accordance with various embodiments.

FIG. 1 is a schematic block diagram of a system 100 formed in accordance with various embodiments. As seen in FIG. 1, the system 100 includes an engine 110 and associated processing unit 120, an output shaft 130, a supplemental boost supply 140, a supply line 144. The depicted system 100 also includes a pressure reduction system 135 and a connection line 133. It may be noted that some embodiments may include a supplemental boost supply 140 but not a pressure reduction system 135, some embodiments may include a pressure reduction system 135 but not a supplemental boost supply 140, and some embodiments may include both a supplemental boost supply 140 and a pressure reduction system 135. Generally, the supplemental boost supply 140 is configured to provide additional pressure to a cylinder of the engine 110 via a supplemental air supply 141 provided via the supply line 144 during idling to help eliminate or reduce oil carryover as discussed herein. The pressure reduction system 135 is configured to reduce pressure in the crankcase portion of the engine when the engine is idling. The pressure reduction in the crankcase portion and/or the additional pressure in the combustion portion inhibits entry of oil from the crankcase portion to the combustion portion when the engine is idling. It may be noted that various embodiments may include additional components (e.g., additional cylinders or other engine components), or may not include all of the components shown in FIG. 1. Further, it may be noted that certain aspects of the system 100 shown as separate blocks in FIG. 1 may be incorporated into a single physical entity, and/or aspects shown as a single block in FIG. 1 may be shared or divided among two or more physical entities.

The depicted engine 110 includes a cylinder 112, a piston 117, an intake port 114, an exhaust port 116, an intake manifold 118, a crankcase 115 and a crank 119. The illustrated engine 110 is a reciprocating internal combustion engine, with the piston 117 reciprocating in the cylinder 112 to turn the crank 119 and output shaft 130. As one example, the engine 110 may be a compression ignition four-stroke engine. The cylinder 112 includes a combustion portion 113 and a crankcase portion 115 on opposite sides of the piston 117. A mixture of air and fuel may be compressed and ignited in the combustion portion 113 to actuate the piston 117 toward the crankcase portion 115 and turn the associated crank 119. The intake port 114 and exhaust port 116 are in fluid communication with the combustion portion 113, and each may include or have associated therewith a valve for controlling the intake of air into the combustion portion 113 and the exhaust of products of combustion from the combustion portion 113, respectively. For example, the intake port 114 may be open and the exhaust port 116 closed during an intake stroke during which the combustion portion 113 is filled with air and fuel. Both the intake port 114 and the exhaust port 116 may be closed during a compression stroke during which an air fuel mixture is compressed, as well as during a power stroke during which the air fuel mixture is ignited to drive the piston 117 to turn the crank 119. Then, during an exhaust stroke, the intake port 114 may remain closed while the exhaust port 116 is opened to direct the flow of products of combustion out of the compression portion 113 of the cylinder 112.

The supply line 144 couples the supplemental boost supply 140 to the intake port 114. It may be noted that the supply line 144 may be coupled with the intake port 114 directly or indirectly. For example, an intake manifold may be interposed between the supply line 144 and the intake port 114, with the supply line 144 connected to the intake manifold. In the illustrated embodiment, the system 100 also includes an intake manifold 118. The depicted intake manifold 118 is in fluid communication with the supplemental boost supply via a supply line 144 and receives a supplemental air supply 141 from the supplemental boost supply 140, as well as air from a conventional intake system, such as standard air supply 190 used to provide air to the cylinder 112 during standard operation under load. The standard air supply 190 may include, for example, an intake opening in fluid communication with the atmosphere, an air filter, and associated hoses, tubes, or other air conduits for routing air from the atmosphere to the intake manifold 118 as air supply 191. The combustion portion 113 of the cylinder 112 receives the supplemental air supply 141 from the intake manifold 118 via the intake port 114. It may be noted that the intake manifold 118 may provide air to additional cylinders (not shown in FIG. 1) as well.

The connection line 133 couples the supplemental evacuation supply 135 to the crankcase portion 115 of the cylinder 112. For example, the connection line 133 may be coupled to a valve 136 that selectively allows the supplemental evacuation supply 135 to reduce pressure in the crankcase portion 115. For example, at idle, or after a predetermined amount of time at idle, the valve 136 may be opened to allow the supplemental evacuation supply 135 to reduce pressure in the crankcase portion 115. The supplemental evacuation supply 135 may include, by way of example, an evacuation pump, and educator, or a venturi. In some embodiments, one or more aspects of the supplemental evacuation system may be shared with or be common with the supplemental boost supply 140. For example, the connection line 133 may be coupled to the compressor 142 (or a different compressor). For instance, a line may be routed from the crankcase portion 115 to a high velocity location one the compressor 142 to draw gasses from the crankcase portion 115. Optionally, the compressor 142 may also be used to provide increased pressure to the combustion portion 113. In various embodiments, a line or lines may tap into a suction device or high velocity air location to draw down the pressure in the crankcase portion 115. For example, intake air may be routed through a smaller cross-sectional area device (venturi) to pull crankcase gasses into an intake system.

Figure 2:
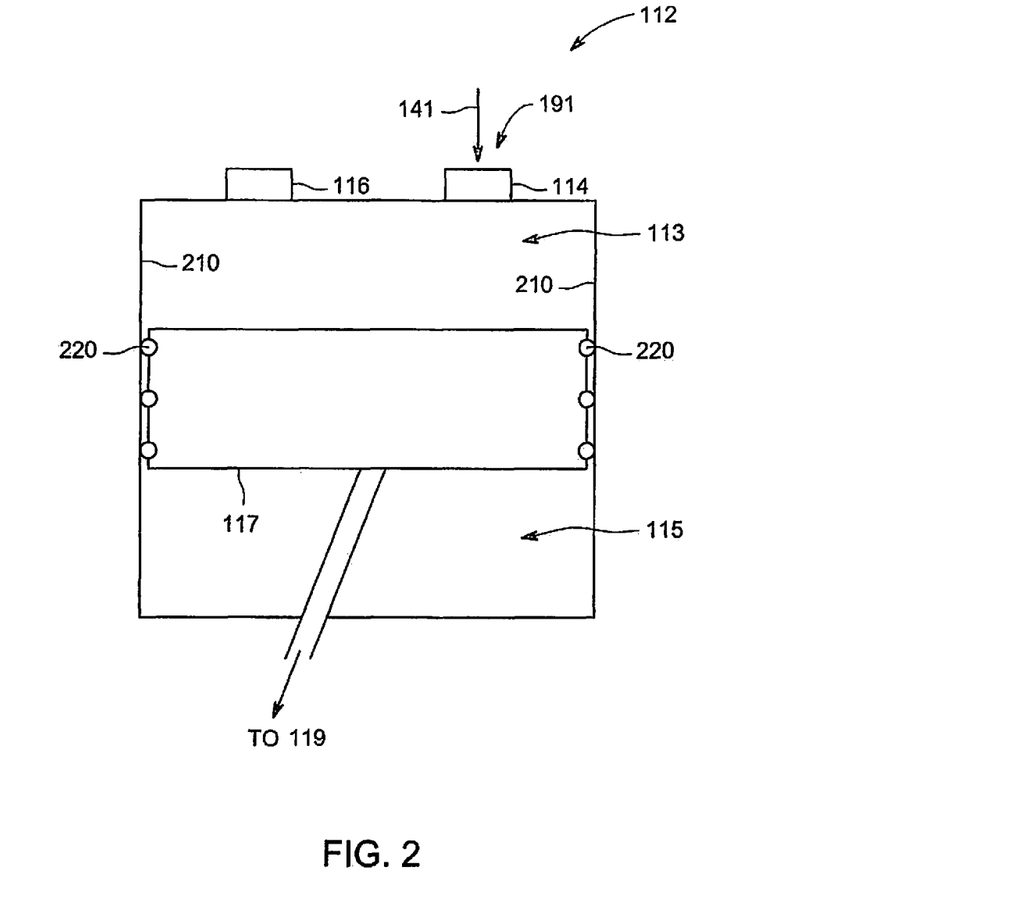
FIG. 2 is a schematic diagram of a cylinder of the engine system of FIG. 1.

FIG. 2 provides a schematic view of the cylinder 112 of FIG. 1. It may be noted that aspects of the system 100 related to the pressure reduction system 135 are omitted from FIG. 2 for clarity, but may be present in various embodiments. As seen in FIG. 2, the cylinder 112 includes a liner 210 that covers an interior surface of the cylinder. The piston 117 includes rings 220 that act as seals between the piston 117 and the liner 210. As the rings 220 and liner 210 may both be made of metal, lubrication may be provided to the metal-to-metal contact between the rings 220 and the liner 210 via the crankcase portion 115. When the engine 110 is running under load or above idle, pressure in the combustion portion 113 of the cylinder 112 is generally sufficient for proper seating of the rings 220 and to prevent most or all of the oil in the crankcase portion 115 from entering the combustion portion 113. However, when the engine 110 is at idle, the pressure differential between the combustion portion 113 and the crankcase portion 115 resulting from use of air only from a conventional intake system and reduction in crankcase evacuation may not be sufficient to properly seat the rings 220 and/or prevent or sufficiently inhibit oil from entering the combustion portion 113 from the crankcase portion 115.

Accordingly, as schematically depicted in FIG. 1, the supplemental boost supply 140 is used in various embodiments to provide the supplemental air supply 141 to increase the pressure in the combustion portion 113 in an amount sufficient to prevent or inhibit entry of oil from the crankcase portion 115 to the combustion portion 113 while at idle. In some embodiments, the supplemental boost supply 140 may share one or more components with the standard air supply 190 used to provide air to the cylinder 112 during standard operation under load, while in other embodiments, the supplemental boost supply may not share any components with the standard air supply 190.

The supplemental boost supply 140 is configured to provide the supplemental air supply 141 to the combustion portion 113 of the engine 110 when the engine 110 is idling to increase pressure in the combustion portion 113 (e.g., relative to an amount of pressure provided by a standard intake system of the engine 110 without use of the supplemental boost supply 140). In various embodiments, the supplemental boost supply 140 is only used during idling. In some embodiments, the supplemental boost supply 140, or portions or aspects thereof, may also be used during operation under load. For example, a first group or configuration of components of the supplemental boost supply 140 may be used during idle and a different group or configuration of components of the supplemental boost supply 140 may be used during operation under load. The supplemental boost supply 140 in various embodiments provides additional air to boost pressure in the combustion portion 113 independent of changes in engine speed or load (e.g., at idle). The depicted supplemental boost supply 140 includes a compressor 142 that is configured to provide the supplemental air supply 141 to the cylinder 112. In various embodiments, the supplemental boost supply 140 may include an air compressor (e.g., an air compressor driven by an electric motor), a turbocharger (e.g., an electrically-assisted turbocharger, a pneumatically-assisted turbocharger, a variable geometry turbocharger), or a supercharger (e.g., an electrically driven supercharger), by way of example.

The processing unit 120 of the illustrated embodiment is configured to control various aspects of the system 100, including the engine 100 and the supplemental boost supply 100. The processing unit 120 provides control signals to one or more aspects of the system 100. For example, the processing unit 120 controls the activation and deactivation of the supplemental boost supply 140 or aspects thereof. In some embodiments, the processing unit 120 controls a rate at which the supplemental boost supply 140 provides air to the cylinder 112. In some embodiments, the processing unit 120 controls the activation and deactivation of the pressure reduction system 135 or aspects thereof. For example, the processing unit 120 may control one or more valves in a connecting line to tap into a suction device or high velocity air location to draw down pressure in the crankcase portion 115. In some embodiments, the processing unit 120 controls an amount of fuel that is delivered to the cylinder (e.g., via a fuel injector). The amount of fuel provided may be provided in response to an input throttle command provided by an operator. A predetermined amount of fuel may be provided when the engine 110 is idling. It may be noted that, when the engine 110 is under load, the processing unit 120 may control supply of fuel (e.g., via fuel injectors) to increase with increasing air supplied to combustion portion 113; however, the fuel provided at idle may remain constant whether supplemental air supply 141 from supplemental boost supply 140 is provided or not. The processing unit 120 in various embodiments receives feedback from one or more sensors configured to detect one or more parameters of the system 100.

In some embodiments, the processing unit 120 controls operation of the supplemental boost supply 140 and/or the pressure reduction system 135, including activating the supplemental boost supply 140 and/or the pressure reduction system 135 after a predetermined time spent idling. For example, if for a particular application oil carryover is not of sufficient concern until after 12 hours of idling, the processing unit 120 may not activate the supplemental boost supply 140 until 12 hours of idling have occurred. Accordingly, unnecessary cycling of the supplemental boost supply 140 on and off for relatively short periods of idling may be avoided or reduced. The processing unit 120 of the illustrated embodiment is configured to perform one or more aspects discussed in connection with the methods or process flows disclosed herein.

The depicted processing unit 120 includes processing circuitry configured to perform one or more tasks, functions, or steps discussed herein. It may be noted that "processing unit" as used herein is not intended to necessarily be limited to a single processor or computer. For example, in various embodiments, the processing unit 120 may include multiple processors and/or computers, which may be integrated in a common housing or unit, or which may be distributed among various units or housings. It may be noted that operations performed by the processing unit 120 (e.g., operations corresponding to process flows or methods discussed herein, or aspects thereof) may be sufficiently complex that the operations may not be performed by a human being within a reasonable time period.

In the illustrated embodiment, the processing unit 120 includes a memory 122. It may be noted that, additionally, other types, numbers, or combinations of modules may be employed in alternate embodiments. Generally, the various aspects of the processing unit 120 act individually or cooperatively with other aspects to perform one or more aspects of the methods, steps, or processes discussed herein. The memory 122 includes one or more computer readable storage media. Further, in various embodiments, the process flows and/or flowcharts discussed herein (or aspects thereof) represent one or more sets of instructions that are stored in the memory 122 for direction operations of the system 100.

It may be noted that in various embodiments, supply line 144 may be dedicated for use only during idling periods when the supplemental air supply 141 is provided, but in other embodiments the supply line 144 may provide air to the combustion portion 113 during periods of operation under load as well as idling. Accordingly, in some embodiments, the supplemental boost supply 140 is configured to provide an operation air supply when the engine is operating at a higher speed than idle (e.g., under load). It may also be noted that a motor of the supplemental boost supply 140 or associated with the supplemental boost supply 140 may also be used to drive a turbo at part load to provide more air, or to be used as a generator at fully power to extract energy and limit peak cylinder pressure.

In other embodiments, the supplemental boost supply 140 provides the supplemental air supply 141 when the engine 110 is idling, but does not provide an air supply when the engine 110 is not idling, or when the engine 110 is operating under load. For example, in some embodiments, the compressor 142 is configured as an air compressor and the supply line 144 is a dedicated supplemental boost supply line, with the compressor 142 only providing air to the cylinder 112 when the engine 110 is idling, and not when the engine 110 is under load. In such embodiments, the compressor 142 may be located remotely from the cylinder 112. For example, in rail vehicle embodiments, the compressor 142 may be located at a remote portion of the locomotive from the intake portion of the engine 110. Use of a remotely located supplemental boost supply that is dedicated for use at idle, or only used at idle, allows for use of a relatively small and/or low cost supplemental boost supply that may be particularly tailored to provide an amount of boost sufficient to prevent or inhibit oil carryover at idle. It may be noted that the amount of pressure boost provided at idle in various embodiments may be relatively small compared to engine pressures when operating under load. For example, under standard operating conditions, a particular engine may idle with a peak pressure of 35-40 bar, but have a pressure up to 220 bar under load. A supplemental boost pressure of about 10 bar may be provided at idle in such an example to help avoid or reduce oil carryover.

Figure 3:
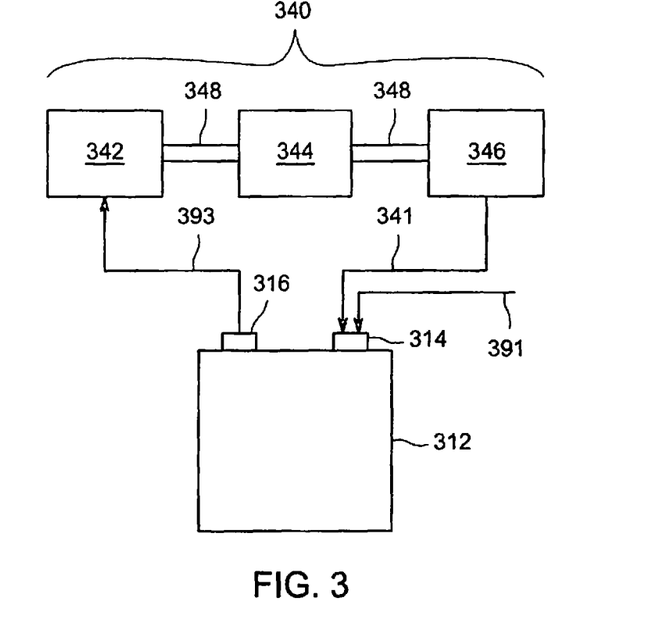
FIG. 3 is a schematic block diagram of an engine system in accordance with various embodiments.

As discussed herein, in some embodiments, the supplemental boost supply 140 may provide air to the cylinder 112 under both idling conditions and operation under load. For example, the supplemental boost supply 140 may include a turbocharger or supercharger that is used to provide air to the cylinder 112 both under load and at idle. FIG. 3 is a schematic block diagram of an engine system 300 in accordance with various embodiments. The engine system 300 includes a cylinder 312 having an intake port 314 and an exhaust port 316. The engine system 300 also includes a supplemental boost supply 340. The supplemental boost supply 340 provides an example of a supplemental boost supply 140 discussed in connection with FIG. 1. Further, the engine system 300 may be generally similar in various aspects to the engine system 100.

In the embodiment depicted in FIG. 3, the supplemental boost supply 340 includes a turbocharger turbine 342, a supplemental assist motor 344, and a compressor 346 coupled to a common shaft 348. The supplemental boost supply 340 is configured to use the turbocharger turbine 342 to drive the compressor 346 when the engine is operating under load (e.g., at a higher speed than idle), and to use the supplemental assist motor 344 when the engine is idling (e.g., responsive to a control signal provided by a processing unit such as processing unit 120 after a predetermined amount of time spent idling or otherwise during a period of engine idling). For example, the turbocharger turbine 342 may receive an exhaust flow 393 from the cylinder 312 to turn the shaft 348. The exhaust flow 393 may be sufficient when operating under load to provide a desired amount of boost via air supply 341 (e.g., in additional to air supply 391 from an atmospheric intake). However, the exhaust flow 393 may not be sufficient at idle to provide a sufficient pressure boost to avoid oil carryover using only the turbocharger turbine 342. Accordingly, in various embodiments, at idle, the shaft 348 is engaged with the supplemental assist motor 344 (and may be disengaged from the turbocharger turbine 342) which is used to drive the compressor 346 to provide the air supply 341. To minimize parasitic losses (e.g., parasitic losses resulting from electrical energy provided to power the supplemental assist motor 344), the supplemental assist motor 344 may provide a relatively low pressure boost (e.g., 10 bar) relative to pressures provided to the cylinder 312 under load. The amount of pressure boost provided to the cylinder 312 at idle in some embodiments is the pressure that is sufficient to provide a desired amount of oil carryover suppression for the particular engine configuration and application. Again, it may be noted that pressure boost to a combustion portion of a cylinder may be used in connection with crankcase pressure reduction (e.g., via pressure reduction system 135 of FIG. 1 and related discussion). In other embodiments, pressure boost to the combustion portion may be eliminated and crankcase pressure reduction employed exclusively.

It may be noted that the boost supplied by the supplemental assist motor 344 is different from boost supplied by the turbocharger turbine 342, and, as used herein, boost that may be provided by an exhaust driven turbocharger driven by exhaust as an engine idles is not considered a supplemental air supply provided at idle. It may be noted that the supplemental boost supply 340 may be used to provide both a supplemental air supply during idling and an operational air supply under load. For example, a first configuration of the supplemental boost supply 340 (e.g., a configuration where the supplemental assist motor 344 is engaged with and driving the shaft 348, but the turbocharger turbine 342 is not) may be used to provide a supplemental air supply during idling, while a second configuration of the supplemental boost supply 340 (e.g., a configuration where the turbocharger turbine 342 is engaged with and driving the shaft 348, but the supplemental assist motor 344 is not) may be used to provide an operational air supply when the engine is operating under load.

Figure 4:
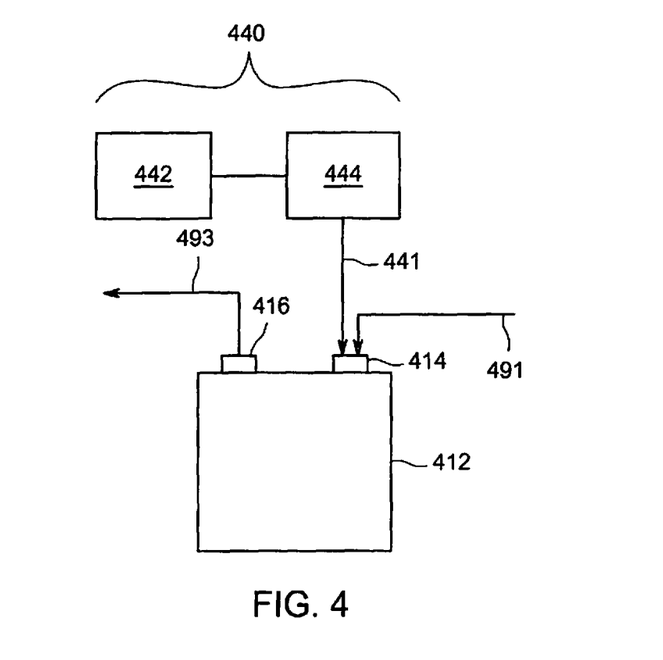
FIG. 4 is a schematic block diagram of an engine system in accordance with various embodiments.

In another example of a supplemental boost supply 140 that provides air to the cylinder 112 under both idling conditions and operation under load, the supplemental boost supply 140 may include or be associated with a supercharger. FIG. 4 is a schematic block diagram of an engine system 400 in accordance with various embodiments. The engine system 400 includes a cylinder 412 having an intake port 414 and an exhaust port 416. A supplemental air supply 441 is provided to the exhaust port via a supplemental boost supply 444 at idle, and an intake air supply 491 is provided from an intake in fluid communication with an atmosphere surrounding the engine system 400. An exhaust flow 493 is provided out of the exhaust port 416. The engine system 400 also includes a supplemental boost supply 440. The supplemental boost supply 440 provides an example of a supplemental boost supply 140 discussed in connection with FIG. 1. Further, the engine system 400 may be generally similar in various aspects to the engine system 100.

In the embodiment depicted in FIG. 4, the supplemental boost supply 440 includes a supercharger motor 442 and a compressor 444. The supplemental boost supply 440 is configured to use the to use the supercharger motor 442 when the engine is idling (e.g., responsive to a control signal provided by a processing unit such as processing unit 120 after a predetermined amount of time spent idling or otherwise during a period of engine idling). In some embodiments, the supplemental boost supply 440 may use the supercharger motor 442 when operating under load as well. For example, a first control input or control scheme may be used to provide a relatively low amount of pressure from the supplemental boost supply 440 at idle, while a second control input or control scheme may be used to provide a relatively high amount of pressure from the supplemental boost supply when operating under load. In other embodiments, the supercharger motor 442 may be used only during idle, and the compressor 444 may be driven by a shaft (e.g., via belt driving from a shaft driven by the crank 119) when operating under load. To minimize parasitic losses (e.g., parasitic losses resulting from electrical energy provided to power the supercharger motor 442), the supercharger motor 442 may provide a relatively low pressure boost (e.g., 10 bar) relative to pressures provided to the cylinder 412 under load. The amount of pressure boost provided to the cylinder 412 at idle in some embodiments is the pressure that is sufficient to provide a desired amount of oil carryover suppression for the particular engine configuration and application. Again, crankcase pressure reduction may be used additionally or alternatively to increasing boost to the combustion portion. Generally, various embodiments increase the change in pressure across the rings of a piston when conditions are present that are problematic for oil carry-over (e.g., idle).

It may be noted that the supplemental boost supply 440 may be used to provide both a supplemental air supply during idling and an operational air supply under load. For example, a first configuration of the supplemental boost supply 440 (e.g., a configuration where the supercharger motor 442 is driving the compressor 444) may be employed during idling, while a second configuration of the supplemental boost supply 440 (e.g., a configuration where the compressor 444 is driven via an output shaft of the engine system 400) may be used to provide an operational air supply when the engine is operating under load. In other embodiments, the supercharger motor 442 may be used during idle and when operating under load; however different control schemes may be employed to control the supercharger motor 442 under idle and under load. For example, the supercharger motor 442 may be controlled to provide a relatively high amount of pressure continuously when operating under load, but may be controlled to provide a relatively lower amount of pressure and/or to provide pressure intermittently when operating under idle (e.g., to minimize parasitic losses while preventing or reducing oil carryover).

Figure 5:
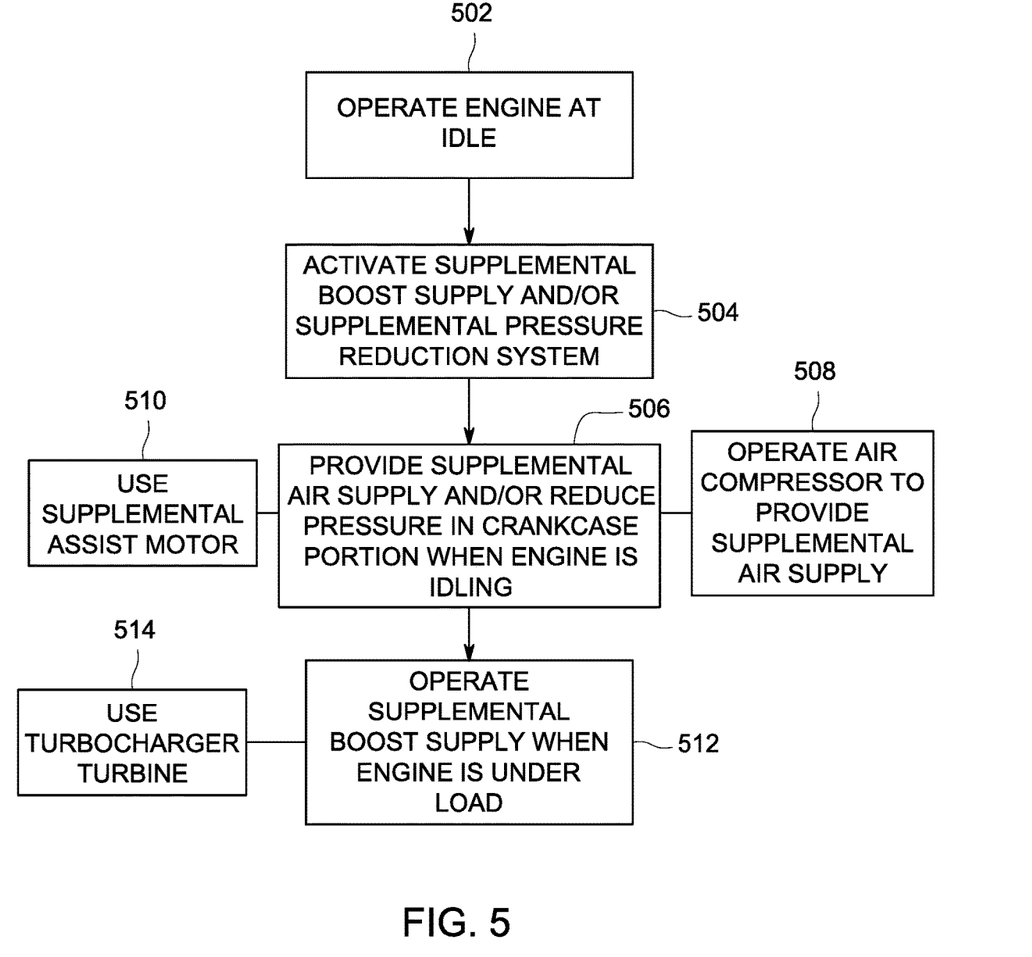
FIG. 5 provides a flowchart of a method for operating an engine in accordance with various embodiments.

FIG. 5 provides a flowchart of a method 500 for operating an engine (e.g., a reciprocating internal combustion engine) in accordance with various embodiments. In various embodiments, the method 500, for example, employs structures or aspects of various embodiments (e.g., systems and/or methods) discussed herein. In various embodiments, certain steps may be omitted or added, certain steps may be combined, certain steps may be performed simultaneously, certain steps may be performed concurrently, certain steps may be split into multiple steps, certain steps may be performed in a different order, or certain steps or series of steps may be re-performed in an iterative fashion. In various embodiments, portions, aspects, and/or variations of the method 500 are used as one or more algorithms to direct hardware to perform operations described herein. In various embodiments, one or more processors (e.g., processing unit 120) uses portions, aspects, and/or variations of the method 500 as one or more algorithms for engine control.

At 502, an engine (e.g., engine system 100, 300, 400) is operated at idle. In some embodiments, the engine is a reciprocating, compression ignition (e.g., diesel) internal combustion engine. For example, the engine may be one of a plurality of engines used to drive a locomotive or powered rail vehicle. Such vehicles may be left running at idle for considerable (e.g., a day or longer) lengths of time in some applications, subjecting the engines to risk of oil carryover.

At 504, a supplemental boost supply (e.g., supplemental boost supply 140, 340, 440) is activated and/or a supplemental pressure reduction system (e.g., pressure reduction system 135) is activated. In some embodiments, the supplemental boost supply and/or pressure reduction system may be activated responsive to an operator input (e.g., an operator may activate the supplemental boost supply and/or pressure reduction system when it is known the engine will be idling for a relatively lengthy amount of time). Alternatively or additionally, the supplemental boost supply and/or pressure reduction system may be activated by one or more processors (e.g., processing unit 120) after satisfaction of a predetermined time condition (e.g., a predetermined amount of time) and/or other condition (e.g., combination of time and ambient conditions) when risk of oil carryover exceeds a predetermined level, to avoid cycling the supplemental boost supply on and off for relatively short periods of idling.

At 506, a supplemental air supply is provided (to a combustion portion of an engine) and/or a pressure in a crankcase portion is reduced when the engine is idling. The supplemental air supply may be provided continuously in some embodiments and/or intermittently. Generally, the supplemental air supply is provided in an amount sufficient to provide a pressure in the combustion engine that is high enough to eliminate or reduce oil carryover. Alternatively or additionally, the pressure may be reduced in the crankcase portion so that the pressure in the crankcase portion is low enough relative to the pressure in the combustion portion to eliminate or reduce oil carryover. As discussed herein, the supplemental air supply may be provided via one or more types of supplemental boost supply, including a separate air compressor, turbocharger, or supercharger.

For example, in some embodiments, at 508, the supplemental air supply is provided via a separate or discrete air compressor. As used herein, a separate or discrete air compressor is not associated with (e.g., forms a part of or is driven by) a turbocharger or supercharger. The supplemental air supply may be located remotely from both a crank or output shaft of the engine as well as the intake system of the engine.

As another example, in some embodiments, at 510, if using an electrically assisted turbocharger, the supplemental air supply is provided via a supplemental assist motor of the supplemental boost supply. For example, the supplemental assist motor may be engaged for use at idle and disengaged when the engine is operating under load or at high speed. The supplemental assist motor may be engaged and disengaged from a shaft driving a compressor with a clutch mechanism.

At 512 of the depicted embodiment, the supplemental boost supply is operated when the engine is under load or at higher operating speeds. It may be noted that in the illustrated embodiment, the supplemental boost supply is operated using a different configuration and/or control scheme to provide boost under load than is used to provide boost at idle. For example, in some embodiments, at 514, a turbocharger turbine is used to provide supplement boost or air supply under load or at higher operating speeds. Thus, while a supplemental assist motor may be used at idle (see, e.g., step 510), an exhaust driven turbine may be used under load. It may be noted that step 512 is omitted in various embodiments, with the supplemental boost supply only used at idle and/or at low operating speeds.

As used herein, a structure, limitation, or element that is "configured to" perform a task or operation is particularly structurally formed, constructed, or adapted in a manner corresponding to the task or operation. For purposes of clarity and the avoidance of doubt, an object that is merely capable of being modified to perform the task or operation is not "configured to" perform the task or operation as used herein. Instead, the use of "configured to" as used herein denotes structural adaptations or characteristics, and denotes structural requirements of any structure, limitation, or element that is described as being "configured to" perform the task or operation. For example, a processing unit, processor, or computer that is "configured to" perform a task or operation may be understood as being particularly structured to perform the task or operation (e.g., having one or more programs or instructions stored thereon or used in conjunction therewith tailored or intended to perform the task or operation, and/or having an arrangement of processing circuitry tailored or intended to perform the task or operation). For the purposes of clarity and the avoidance of doubt, a general purpose computer (which may become "configured to" perform the task or operation if appropriately programmed) is not "configured to" perform a task or operation unless or until specifically programmed or structurally modified to perform the task or operation.

It should be noted that the particular arrangement of components (e.g., the number, types, placement, or the like) of the illustrated embodiments may be modified in various alternate embodiments. For example, in various embodiments, different numbers of a given module or unit may be employed, a different type or types of a given module or unit may be employed, a number of modules or units (or aspects thereof) may be combined, a given module or unit may be divided into plural modules (or sub-modules) or units (or sub-units), one or more aspects of one or more modules may be shared between modules, a given module or unit may be added, or a given module or unit may be omitted.

It should be noted that the various embodiments may be implemented in hardware, software or a combination thereof. The various embodiments and/or components, for example, the modules, or components and controllers therein, also may be implemented as part of one or more computers or processors. The computer or processor may include a computing device, an input device, a display unit and an interface, for example, for accessing the Internet. The computer or processor may include a microprocessor. The microprocessor may be connected to a communication bus. The computer or processor may also include a memory. The memory may include Random Access Memory (RAM) and Read Only Memory (ROM). The computer or processor further may include a storage device, which may be a hard disk drive or a removable storage drive such as a solid state drive, optic drive, and the like. The storage device may also be other similar means for loading computer programs or other instructions into the computer or processor.

As used herein, the term "computer," "controller," and "module" may each include any processor-based or microprocessor-based system including systems using microcontrollers, reduced instruction set computers (RISC), application specific integrated circuits (ASICs), logic circuits, GPUs, FPGAs, and any other circuit or processor capable of executing the functions described herein. The above examples are exemplary only, and are thus not intended to limit in any way the definition and/or meaning of the term "module" or "computer."

The computer, module, or processor executes a set of instructions that are stored in one or more storage elements, in order to process input data. The storage elements may also store data or other information as desired or needed. The storage element may be in the form of an information source or a physical memory element within a processing machine.

The set of instructions may include various commands that instruct the computer, module, or processor as a processing machine to perform specific operations such as the methods and processes of the various embodiments described and/or illustrated herein. The set of instructions may be in the form of a software program. The software may be in various forms such as system software or application software and which may be embodied as a tangible and non-transitory computer readable medium. Further, the software may be in the form of a collection of separate programs or modules, a program module within a larger program or a portion of a program module. The software also may include modular programming in the form of object-oriented programming. The processing of input data by the processing machine may be in response to operator commands, or in response to results of previous processing, or in response to a request made by another processing machine.

As used herein, the terms "software" and "firmware" are interchangeable, and include any computer program stored in memory for execution by a computer, including RAM memory, ROM memory, EPROM memory, EEPROM memory, and non-volatile RAM (NVRAM) memory. The above memory types are exemplary only, and are thus not limiting as to the types of memory usable for storage of a computer program. The individual components of the various embodiments may be virtualized and hosted by a cloud type computational environment, for example to allow for dynamic allocation of computational power, without requiring the user concerning the location, configuration, and/or specific hardware of the computer system.

It is to be understood that the above description is intended to be illustrative, and not restrictive. For example, the above-described embodiments (and/or aspects thereof) may be used in combination with each other. In addition, many modifications may be made to adapt a particular situation or material to the teachings of the invention without departing from its scope. Dimensions, types of materials, orientations of the various components, and the number and positions of the various components described herein are intended to define parameters of certain embodiments, and are by no means limiting and are merely exemplary embodiments. Many other embodiments and modifications within the spirit and scope of the claims will be apparent to those of skill in the art upon reviewing the above description. The scope of the invention should, therefore, be determined with reference to the appended claims, along with the full scope of equivalents to which such claims are entitled. In the appended claims, the terms "including" and "in which" are used as the plain-English equivalents of the respective terms "comprising" and "wherein." Moreover, in the following claims, the terms "first," "second," and "third," etc. are used merely as labels, and are not intended to impose numerical requirements on their objects. Further, the limitations of the following claims are not written in means-plus-function format and are not intended to be interpreted based on 35 U.S.C. § 112(f), unless and until such claim limitations expressly use the phrase "means for" followed by a statement of function void of further structure.

This written description uses examples to disclose the various embodiments, and also to enable a person having ordinary skill in the art to practice the various embodiments, including making and using any devices or systems and performing any incorporated methods. The patentable scope of the various embodiments is defined by the claims, and may include other examples that occur to those skilled in the art. Such other examples are intended to be within the scope of the claims if the examples have structural elements that do not differ from the literal language of the claims, or the examples include equivalent structural elements with insubstantial differences from the literal language of the claims.

What is claimed is:

1. A system comprising:
    at least one cylinder configured for use in an engine, the at least one cylinder comprising a combustion portion and a crankcase portion on opposite sides of a piston, the at least one cylinder comprising an intake port and an exhaust port in fluid communication with the combustion portion, wherein the intake port is coupled to an intake manifold;
    a supplemental boost supply and a pump system, wherein the supplemental boost supply comprises a forced induction intake device that includes (i) a turbocharger turbine, a supplemental assist motor, and a compressor each coupled to a common shaft or (ii) a supercharger and a supplemental assist motor each coupled to a common shaft, the supercharger including a compressor; and
    a controller configured to generate a control signal in response to the engine reaching a predetermined amount of time spent idling, the controller operably coupled to the at least one cylinder, the supplemental boost supply, and the pump system;
    wherein the supplemental boost supply is configured to drive the compressor when the engine is operating under load and, responsive to the control signal, to drive the compressor using the supplemental assist motor to provide a supplemental air supply to the combustion portion of the engine via a supply line when the engine is idling for the predetermined amount of time to increase pressure in the combustion portion to inhibit entry of oil into the combustion portion from the crankcase portion,
    wherein the supplemental boost supply is different from a standard air supply that is coupled to the intake manifold,
    wherein the pump system is coupled to the at least one cylinder via a connection line and configured to reduce pressure in the crankcase portion when the engine is idling for the predetermined amount of time to inhibit entry of oil into the combustion portion from the crankcase portion, and
    wherein the controller, by generating the control signal, activates the pump system after the engine reaches the predetermined amount of time.

2. The system of claim 1, wherein the supplemental boost supply is configured to provide an operational air supply when the engine is operating at a speed higher than an idling speed of the engine.

3. The system of claim 1, wherein the predetermined amount of time is at least 12 hours.

4. The system of claim 1, wherein the pump system comprises an evacuation pump.

5. The system of claim 1, wherein the predetermined amount of time is at least a day.

6. A method comprising:
    operating an engine at idle, the engine comprising at least one cylinder, the at least one cylinder comprising a combustion portion and a crankcase portion on opposite sides of a piston, the at least one cylinder comprising an intake port and an exhaust port in fluid communication with the combustion portion, wherein the intake port is coupled to an intake manifold;
    generating a control signal when the engine reaches a predetermined amount of time spent idling; and
    providing a supplemental air supply from a supplemental boost supply, wherein the supplemental boost supply comprises a forced induction intake device that includes (i) a turbocharger turbine, a supplemental assist motor, and a compressor each coupled to a common shaft or (ii) a supercharger and a supplemental assist motor each coupled to a common shaft, the supercharger including a compressor, wherein providing the supplemental air supply comprises driving the compressor using the supplemental assist motor to provide the supplemental air supply to the combustion portion of the engine via a supply line in response to the control signal to increase pressure in the combustion portion to inhibit entry of oil into the combustion portion from the crankcase portion, wherein the supplemental air supply is different from a standard air supply coupled to the intake manifold;
    wherein the predetermined amount of time is at least 12 hours.

7. The method of claim 6, wherein the method further comprises operating the supplemental boost supply to provide an operational air supply when the engine is operating under load.

8. The method of claim 6, wherein the method further comprises driving the compressor using the forced induction intake device when the engine is operating under load.

9. The method of claim 6, further comprising activating the supplemental boost supply after the engine reaches the predetermined amount of time.

10. The method of claim 6, wherein the predetermined amount of time is at least a day.

11. A system comprising:
    a controller configured to generate a control signal in response to an engine reaching a predetermined amount of time spent idling; and
    a supplemental boost supply that is different from a standard air supply, the supplemental boost supply coupled to an intake manifold of the engine via a supply line and operably coupled to the controller, wherein the supplemental boost supply comprises a forced induction intake device that includes (i) a turbocharger turbine, a supplemental assist motor, and a compressor each coupled to a common shaft or (ii) a supercharger and a supplemental assist motor each coupled to a common shaft, the supercharger including a compressor, wherein the supplemental boost supply is configured to drive the compressor when the engine is operating under load and, responsive to the control signal, to drive the compressor using the supplemental assist motor to provide a supplemental air supply to a combustion portion of the engine via the supply line when the engine reaches the predetermined amount of time to increase pressure in the combustion portion to inhibit entry of oil into the combustion portion from a crankcase;

wherein the controller, by generating the control signal, activates the supplemental boost supply after the engine reaches the predetermined amount of time; and wherein the predetermined amount of time is at least 12 hours.

12. The system of claim 11, wherein the supplemental boost supply is configured to provide an operational air supply when the engine is idling.

13. A system comprising:

an intake manifold of an engine configured to direct air into at least one cylinder in the engine, the at least one cylinder comprising a combustion portion and a crankcase portion on opposite sides of a piston, the at least one cylinder comprising an intake port and an exhaust port in fluid communication with the combustion portion, wherein the intake port is coupled to the intake manifold;

a pump system coupled to the at least one cylinder, wherein the pump system comprises an evacuation pump that, responsive to a control signal, is configured to draw gasses from the crankcase portion of the at least one cylinder when the engine is idling for a plural number of days to reduce pressure in the crankcase portion to inhibit entry of oil into the combustion portion from the crankcase portion;

a supplemental boost supply coupled to the at least one cylinder comprising a turbocharger turbine, a supplemental assist motor, and a compressor each coupled to a common shaft, wherein the supplemental boost supply, responsive to the control signal, is configured to drive the compressor using the supplemental assist motor to provide a supplemental air supply to the intake manifold via a supply line when the engine is idling for the plural number of days to increase pressure in the combustion portion to inhibit entry of oil into the combustion portion from the crankcase portion, and a controller configured to generate the control signal in response to detecting the engine idling for the plural number of days, the controller operably coupled to the intake manifold, the pump system, and the supplemental boost supply;

wherein the intake manifold is configured to direct air from an air source outside of the engine into the at least one cylinder when the engine is operating under a load, wherein the intake manifold, responsive to the control signal, is configured to direct the supplemental air supply from the supplemental boost supply alone into the at least one cylinder and is configured to not direct air from the air source outside of the engine into the at least one cylinder when the engine is idling for the plural number of days.

* * * * *